United States Patent
Sivakumar et al.

(10) Patent No.: US 7,487,433 B2
(45) Date of Patent: Feb. 3, 2009

(54) EXCEPTION HANDLING IN CONTENT BASED ROUTING SOLUTIONS

(75) Inventors: Arunchallam S. Sivakumar, Issaquah, WA (US); Kartik Paramasivam, Redmond, WA (US); Ruslan Yakushev, Sammamish, WA (US); Martin T. Wasznicky, Sherman Oaks, CA (US)

(73) Assignee: Microsoft Corporation, Redmond, WA (US)

( * ) Notice: Subject to any disclaimer, the term of this patent is extended or adjusted under 35 U.S.C. 154(b) by 625 days.

(21) Appl. No.: 11/150,648

(22) Filed: Jun. 10, 2005

(65) Prior Publication Data

US 2007/0079168 A1 Apr. 5, 2007

(51) Int. Cl.
*G06F 11/00* (2006.01)
*H03M 13/00* (2006.01)
(52) U.S. Cl. .................................... 714/799; 714/57
(58) Field of Classification Search ............ 714/12, 714/13, 25, 57, 746
See application file for complete search history.

(56) References Cited

U.S. PATENT DOCUMENTS

| | | | |
|---|---|---|---|
| 6,515,967 B1 * | 2/2003 | Wei et al. | 370/244 |
| 6,598,077 B2 * | 7/2003 | Primak et al. | 709/219 |
| 6,598,177 B1 * | 7/2003 | Jones et al. | 714/30 |
| 7,103,810 B2 * | 9/2006 | Childress et al. | 714/57 |

OTHER PUBLICATIONS

Pappas et al., Fault tolerant data delivery for multicast overlay networks, 2004, IEEE, p. 1 to 10.*

* cited by examiner

*Primary Examiner*—Shelly A Chase
(74) *Attorney, Agent, or Firm*—Amin, Turocy & Calvin, LLP

(57) ABSTRACT

The subject invention provides a system and/or a method that facilitates error detection and correction associated with content-based routing. A routing system can include an analysis component that determines a received message is associated with an error. An error report generating component can append error-related metadata to the received message to create an error report message. The error report messages can then be utilized to allow subscribers to automatically handle failed messages, wherein such corrected messages can be resubmitted to the content-based router.

18 Claims, 10 Drawing Sheets

EXCEPTION HANDLING IN CONTENT BASED ROUTING SOLUTIONS

BACKGROUND OF THE INVENTION

Continued advancements in computer and networking technologies have transformed the computer from a high-cost, low performance data processing machine to a low cost and efficient communications, problem solving and entertainment system that has revolutionalized the manner in which personal and business related tasks are performed each day. Examples of such tasks include basic correspondence, purchasing goods, providing goods, gathering information, requesting services, providing services, etc. Traditionally, personal tasks such as corresponding with friends and family required a person to obtain paper, a writing utensil, an envelope and a stamp, generate a hardcopy of the correspondence, and deposit the letter in the mail. The foregoing generally required the consumer to expend money and time and necessitated travel to obtain supplies and/or mail the letter. Additionally, the recipient would not receive the letter until hours or days later, depending on how much the sender was willing to pay for a mailing service. Conventional business transactions commonly involve several phone conversations, paper communication (e.g., mail and fax), and/or in-person interaction with one or more parties; and, in some instances, one or more of the parties could turn out not to be a suitable partner, for example, due to cost, proximity or inability to meet transaction needs.

Today, an increasing number of personal and business transactions are likely to be facilitated and/or performed with computer and networking technologies. For example, correspondence, bill paying, shopping, budgeting and information gathering can all be achieved with the assistance of a computer connected to an appropriate network and with suitable user privileges. By way of example, a consumer/provider can obtain a computer (e.g., a desktop computer, a laptop, a handheld, a cell phone, etc.) and interface it with a network such as a LAN, a WAN, a Wi-Fi network, the Internet, etc. The network can provide a communications link from the computer to one or more other computers (e.g., servers), which can be located essentially anywhere throughout the world. This link can be utilized to exchange data, consume merchandise, and access a wealth of information residing in a repository of data banks, for example. Another advantage of such communication is that it can be utilized at the convenience of one's home, at the user's fingertips or a click of a mouse button, and, at many times, at no or minimal expense to the user.

A growing trend is to leverage the benefits of the web domain to facilitate completing personal and business transactions since the web domain can provide user-friendly interface, a relatively secure environment, interoperability, and a developer-friendly environment, for example. In the web domain, services associated with various web sites and/or disparate web servers can be accessed through a web browser. For example, a web user can deploy a web browser and access a web site by entering the site's Uniform Resource Locator (URL) into an address bar of the web browser. A typical URL includes at least four pieces of information that facilitate establishing a link to the web site. Namely, the URL can include a protocol (a communications language) that indicates a set of rules and standards for information exchange, an address or location of the web site, a name of an organization that maintains the web site, and a suffix (e.g., com, org, net, gov and edu) that identifies the type of organization. As an example, an exemplary fictitious address can be delineated as follows: "http" can specify that the web server utilizes Hypertext Transfer Protocol (HTTP); "://" is standard URL syntax; "www" can specify the web site resides within the World Wide Web ("web"); "foo" can specify the web server is located at Foo Corporation; "com" can specify that Foo Corporation is a commercial institution; and "." is utilized as a separator between the foregoing fields.

This distributed means of communication (communication between computers residing at disparate locations) over the Internet has lead to a concept referred to as a "web service." In general, a web service can be defined as an application that executes in connection with the web to provide a mechanism to locate and select a service provider to carry out a task or to provide such services. In many instances, communication amongst such services includes providing information related to the task and/or services offered by disparate users. Such information can be utilized to facilitate matching a service that is requesting a provider with a suitable service provider. In general, to provide such matching, context-based routing can be employed, wherein content-based routing is the process where intermediaries (e.g., applications) redirect incoming messages based at least in part upon the content of the message. In conventional systems and/or methods, if a content-based routing system could not route a message, the message would be suspended and undelivered until user intervention corrected such message.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methods that facilitate error detection and correction related to content-based routing. A content-based router (CBR) component can include an analysis component that can determine whether or not a message has failed (e.g., undeliverable) and/or has an error associated therewith. The content-based router can further include an error report generating component that can receive the failed message and append error-related metadata to the failed message to create an error report message, wherein the error report message can be utilized to automatically correct the failed message. The error report message can allow a subscribing error handling application to receive the failed message based at least in part upon the error specific metadata and a routing technique. It is to be appreciated that the error report message can be submitted to the same content-based router to automatically route the failed message to a correcting error handling application.

In accordance with one aspect of the subject invention, the error report generating component can include a cleanse component. The cleanse component deletes any routing metadata associated with the failed message to prevent the routing of such message to expecting applications. In addition, the error report generating component can include an append component that appends the failed message with error-related metadata. The error-related metadata can be error specific and can include error details such as, but are not limited to, a location where the message failed, the reason for failure, the error code and category, . . . .

In accordance with another aspect of the subject invention, the CBR component can include a publish component that can post the error report message to allow at least one subscriber to automatically handle the failed message. Moreover, the publish component can route any messages based at least in part upon the content of such messages to at least one application and/or subscriber. The subscribing error handler application can receive the error report message based at least in part upon the error specific metadata. For instance, the following can be performed after the subscriber has received the error report message based at least in part upon the error specific metadata associated therewith: 1) if the subscriber and/or error handler recognizes the error and knows how to fix it, the message is automatically corrected and re-submitted for content-based routing; 2) if the error handler and/or subscriber recognizes the error but cannot fix it, a business process with a human workflow can send the message to a business user and/or application and awaits the correction to be invoked; 3) the error handler and/or subscriber can save the failed messages in a dedicated storage for a business user and/or application to review; and 4) if the subscriber and/or error handler does not recognize the failed message or does not know how to handle the error associated to the message or the application itself fails, the message can be suspended within a dead queue. The dead queue is a concept employed within content-based routing and represents a location where failed messages can be stored. It can also be referred to as a dead letter queue, suspended queue, error queue, etc.

In accordance with another aspect of the subject invention, the CBR component can include a manager that manages any subscriber, application, error handler, and/or error handling application that attempts to provide automatic handling of a message and/or an error report message. In addition, the manager can implement security techniques to validate any such subscribers, applications, error handlers, and/or error handling applications. In another aspect, the CBR component can utilize a filter that specifies the message and/or error specific details that can be invoked by the router to determine if the message and/or error report message should be given to a particular application, subscriber, and/or error handler. In other aspects of the subject invention, methods are provided that facilitate error detection and correction related to content-based routing.

The following description and the annexed drawings set forth in detail certain illustrative aspects of the invention. These aspects are indicative, however, of but a few of the various ways in which the principles of the invention may be employed and the subject invention is intended to include all such aspects and their equivalents. Other advantages and novel features of the invention will become apparent from the following detailed description of the invention when considered in conjunction with the drawings.

DESCRIPTION OF THE INVENTION

Figure 1:
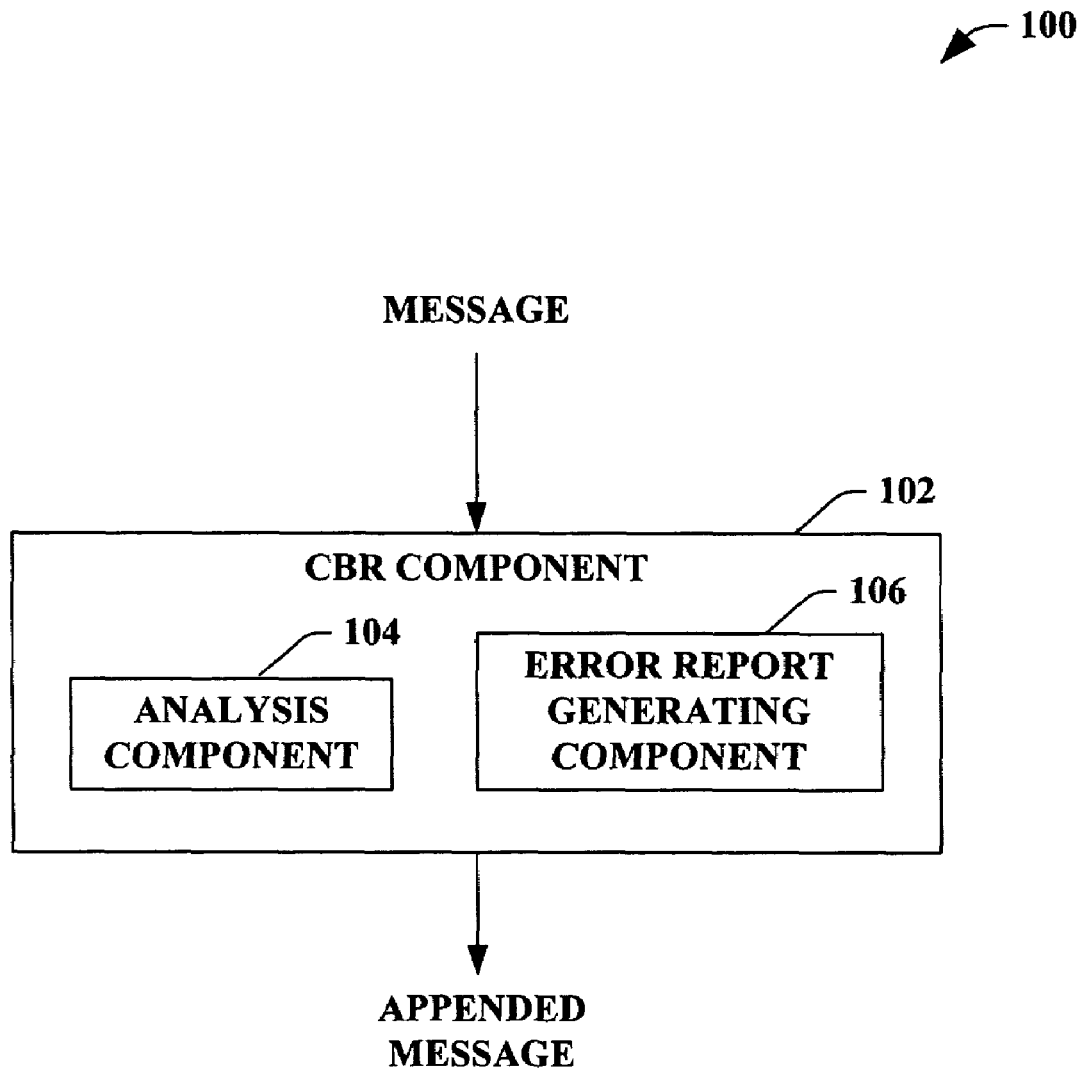
FIG. 1 illustrates a block diagram of an exemplary system that facilitates error detection and correction associated with content-based routing.

As utilized in this application, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

Now turning to the figures, FIG. 1 illustrates a system 100 that facilitates error detection and correction associated with content-based routing. The system 100 allows the automatic correction of a failed message allowing the message to be appropriately routed based on the content of the message. A message can be received by a content-based routing (CBR) component 102, wherein such message can be routed based at least in part upon content associated therewith. It is to be appreciated that the CBR component 102 can be any suitable content-based routing system. The CBR component 102 can employ an analysis component 104 that can determine whether a message is associated with an error. The message can be related to an error if, for example, the message cannot be routed and/or is undeliverable.

For example, a failed message and/or message associated with an error can be a receive order that references a non-existent item in inventory. Without such an error, the message can be routed to any suitable inventory system that handles such messages such as a subscriber (not shown). Yet, based on such incorrect data associated with the receive order, the CBR component 102 is unable to deliver the receive order to the appropriate application and/or system. Conventionally, such receive order (e.g., message) would be suspended and undelivered. An error report generating component 106 can append such error messages and/or failed messages with metadata related to the error, wherein such appended message (also referred to as an error report message) can be posted to allow various subscribers, such as error handling applications to automatically correct failed messages and/or error messages. The error-related metadata can contain error details such as, but not limited to, a location where the message failed, the reason for failure, the error code and category, . . . . Once the error(s) are corrected, the message (e.g., error report message) can be re-published to the CBR component 102 that routes the message accordingly. Although the error report generating component 106 is incorporated into the CBR component 102, it is to be appreciated that the error report generating component 106 can be a separate component that can create an error message report and re-submit such report to the CBR component 102 to route accordingly. Moreover, it is to be appreciated and understood that the CBR component 102 can route error-free messages as well as error report messages based at least in part upon the content of the message and the error metadata respectively.

In one example, a message can be received by the CBR component 102, wherein the message has an error, such as, but not limited to, a syntax error, a recipient unavailable and/or exists, a validation error, etc. The analysis component 104 can determine that the message has failed and/or relates to an error. The error report generating component 106 can cleanse the message of any routing metadata and append the message with error-related metadata. Such appended message, referred to as an error report message, can be subscribed to by a subscribing error handling application that can automatically correct the error. The subscription to the error-related messages can allow processing errors to be corrected by applications handling the particular errors via routing within the CBR component 102. It is to be appreciated that various actions can be employed based on conditions related to the error report message (discussed infra). Once automatically corrected by the error handling applications, the corrected message can then be re-published with the CBR component 102, wherein the corrected message can be routed according to the content of the message.

In one aspect in accordance with the subject invention, the subscribing error handling application and/or error handler can perform various actions after receiving a failed message (e.g., a failed message cleared of routing metadata and appended with error-related metadata, also referred to as an error report message). For instance, if the error handler and/or subscriber are able to comprehend and correct the error, the correction is applied and the corrected message is resubmitted to the CBR component 102. In another example, the error handler and/or subscriber can recognize the error but is unable to correct such error, a business process (e.g., business process with human workflow) can be initiated that sends the uncorrectable message to, for example, a business user and/or application, where the system 100 waits for the corrected message. In yet another example, the error handler and/or subscriber can choose to store and/or save all failed messages in a dedicated storage for a further analysis (e.g., a business user, an application, etc.). In another example, the error handler and/or subscriber can not recognize the failed message or not know how to handle the failed message. In such scenario, the failed message can be suspended.

Moreover, the system 100 can further include any suitable and/or necessary interface component (not shown), which provides various adapters, connectors, channels, communication paths, etc. to integrate the CBR component 102, the analysis component 104, and the error report generating component 106 into virtually any operating and/or database system(s). In addition, the interface component can provide various adapters, connectors, channels, communication paths, etc., that provide for interaction with the CBR component 102, the analysis component 104, and the error report generating component 106.

Figure 2:
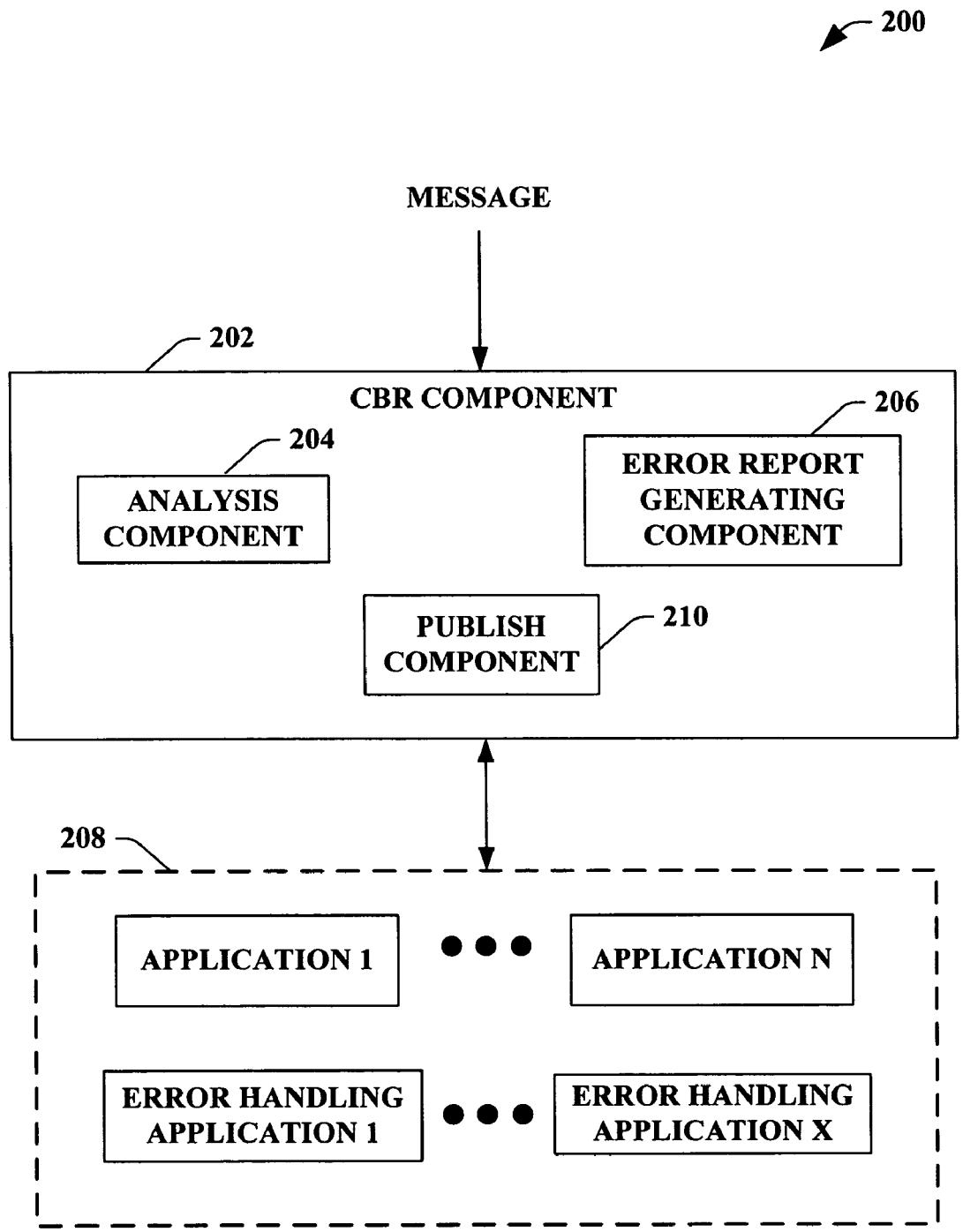
FIG. 2 illustrates a block diagram of an exemplary system that facilitates automatically handling an error message related to content-based routing systems.

FIG. 2 illustrates a system 200 that facilitates automatically handling an error message related to content-based routing systems. A CBR component 202 can receive a message that is to be routed based at least in part upon the content of such message. The message can contain an error, wherein the CBR component 202 cannot appropriately route the message. An analysis component 204 can determine if the message can be correctly routed or if the message failed (e.g., the message has a related error). It is to be appreciated that if the message contains no error, the CBR component 202 can route the message accordingly by publishing the message to allow various applications 208 handle such messages. It is to be appreciated that such applications 208 can subscribe to the CBR component 202 in order to receive any messages based on content. Such publishing for an error-free message can be invoked by a publish component 210. An error-free message can be routed to various applications 208, wherein applications 208 can be any number of applications from application 1 to application N, with N being an integer greater than 1. Based on the content of the message, the CBR component 202 can route the message to a particular content-specific application. Although depicted as applications, it is to be understood that the CBR component 202 can route the error-free messages to any system that is to receive such content related messages.

The CBR component 202 can include an error report generating component 206 that can receive a failed message and/or any message with an error related therewith from at least one of the analysis component 204 and the CBR component 202. The error report generating component 206 can delete any routing metadata associated with the message in order to prevent routing of such message to expecting applications 208. Furthermore, the error report generating component 206 can append the message with error-related metadata (e.g., specific to the error and/or reason the message failed), wherein the message associated with the error-related data can be referred to as an error report message. The error-related metadata can contains details such as, but not limited to, the location of where the message failed, the reason of failure, error code and category, syntax error location, syntax error description, etc. As stated above, the error report generating component 206 can be a separate component to which failed messages can be received and error report messages can be published via the CBR component 202.

The publish component 210 can post the appended message and/or error report message to allow various error handling applications within applications 208 that subscribe to receive the error report messages. It is to be appreciated that the publish component 210 can post error-free messages as well as the error report messages to various applications 208 and error handling applications respectively. Moreover, for the purpose of the subject application, applications 208 and error handling applications can be one of the same (e.g., an entity that receives a routed message via the CBR component 202), yet the error handling applications can be applications and/or error handlers that receive the error report messages. There can be any suitable number of error handling applications from an error handling application 1 to an error handling application X, where X is an integer greater than 1. The error handling applications can subscribe to specific error report messages such that the error handling application and/or error handler can correct/fix the error that is subscribed thereto. The error handling applications can automatically identify an error and correct such error. Moreover, if the error handling applications cannot automatically identify an error related to the message and/or automatically correct such error, one of the following can occur: 1) a business process can send the message to a business user and/or application where the system 200 awaits a corrected message; 2) save the message in a dedicated storage for business users and/or applications for review; and 3) suspend the message. It is to be appreciated and understood that the publish component 210 can represent the posting and/or subscription capabilities of the CBR component 202 and/or any suitable content-based routing in order to provide the error report message and/or the error-free message to the applications 208 that subscribe to content-based routing via the CBR component 202.

In one example, a first message can be error-free and be routed by the CBR component 202 and the publish component 210 to an application and/or system within applications 208 based at least in part upon the message content via routing metadata and/or a subscription to such message content. A second message can be intended for an application but fail because of an error, and thus be undeliverable by the CBR component 202. The failed message can be cleansed and have error-related metadata associated with the message (referred to as an error report message) by the error report generating component 206. The publish component 210 can then post the error report message allowing an error handling application within the applications 208 and/or error handlers to automatically handle the failed message. It is to be appreciated that the subscriber and/or error handling application that receives the error report message is specific to the related error. As stated above, the error handling application is a subscriber that subscribes to receive such particular error report messages based at least in part upon the error-related metadata. Furthermore, the applications 208 all subscribe to receive messages based at least in part upon the content of such messages.

Figure 3:
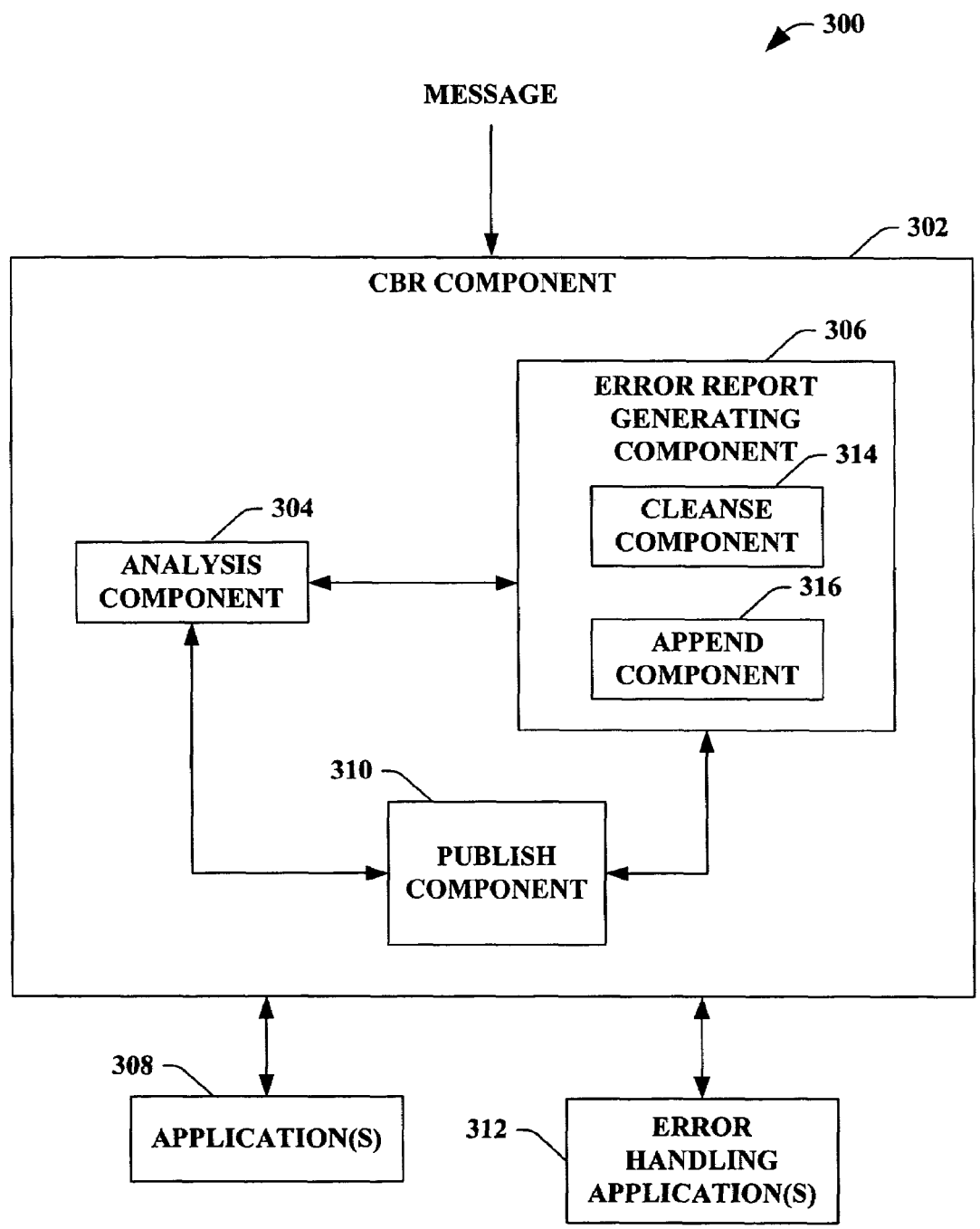
FIG. 3 illustrates a block diagram of an exemplary system that facilitates employing error handling associated with content-based routing.

FIG. 3 illustrates a system 300 that facilitates employing error handling associated with content-based routing. A CBR component 302 can receive a message intended for content-based routing, wherein the message can be determined to have an error related thereto and/or undeliverable by an analysis component 304. The message, if error-free, can be routed to an appropriate application(s) 308 and/or a system that is associated with handling such messages. To route an error-free message, a publish component 310 can post and/or publish the message allowing at least one application(s) 308 to receive and/or handle such message. For example, a receive order can be routed to an inventory application and/or system that can handle the message accordingly. It is to be appreciated that the CBR component 302 can interact with any number of application(s) 308 as depicted above.

Upon determination of a message containing an error and/or a message being undeliverable, the analysis component 304 can transmit the failed message to an error report generating component 306 to create an error report message (e.g., a failed message with error-related metadata associated therewith). The error report generating component 306 can include a cleanse component 314 that can delete any metadata, and in particular, any routing metadata, from a failed messaged (e.g., a message with an error related therewith). The cleanse component 314 deletes any metadata associated with the failed message to prevent the routing of such message to expecting applications 308. It is to be appreciated that the cleanse component 314 can identify and delete any metadata associated with the failed message.

An append component 316 can be utilized by the error report generating component 306 to provide the appendage of error-specific routing metadata to the failed message. In other words, the append component 316 can append any necessary error-related metadata to the failed message to create an error report message. The append component 316 can associate error details with the error report message, wherein the error details can include, but are not limited to, a location of message failure, a reason for failure, a error code and category, a syntax error, a syntax error location, recipient details, validation information, . . . . It is to be appreciated that the append component 316 can determine the appropriate metadata to associate with the failed message.

The error report message (e.g., the failed message with error-related metadata associated therewith) can be posted by the publish component 310 allowing various error handling application(s) 312 to automatically handle any failed messages. It is to be appreciated that the error handling application(s) 312 can be applications that are specific to receiving and handling the error report messages. The error handling application(s) 312 (e.g., error handling applications) and/or error handlers can automatically correct errors related to the failed messages by subscribing to particular error report messages. For example, a first error handling application can subscribe to syntax errors, wherein any error report message having metadata associated with a syntax error can be automatically handled by the first error handling application. Once the error handling application(s) 312 automatically handle the error related to the failed message, the corrected message (e.g., corrected by the subscription of an error handling application and/or error handler) can be routed by the CBR component 302 by posting the corrected message via the publish component 310.

For example, a first message can be a shipping order received by the CBR component 302 that is to be routed and/or published to a particular application and/or system to handle such message. A second message can be a receive order that has an error associated therewith. The analysis component 308 can determine whether or not any message has an error and/or if any message cannot be routing for any reason. The failed message can be cleansed by deleting any associated metadata with the cleanse component 314. The metadata-free message can then have error-related metadata associated with the message by the append component 316, allowing the publish component 310 within the CBR component 302 to post the error report message to any error handing application(s) 312. The error handling application(s) 312 can automatically correct and/or fix the failed message, wherein the message can be re-published to the CBR component 302 allowing the message to be routed accordingly.

Figure 4:
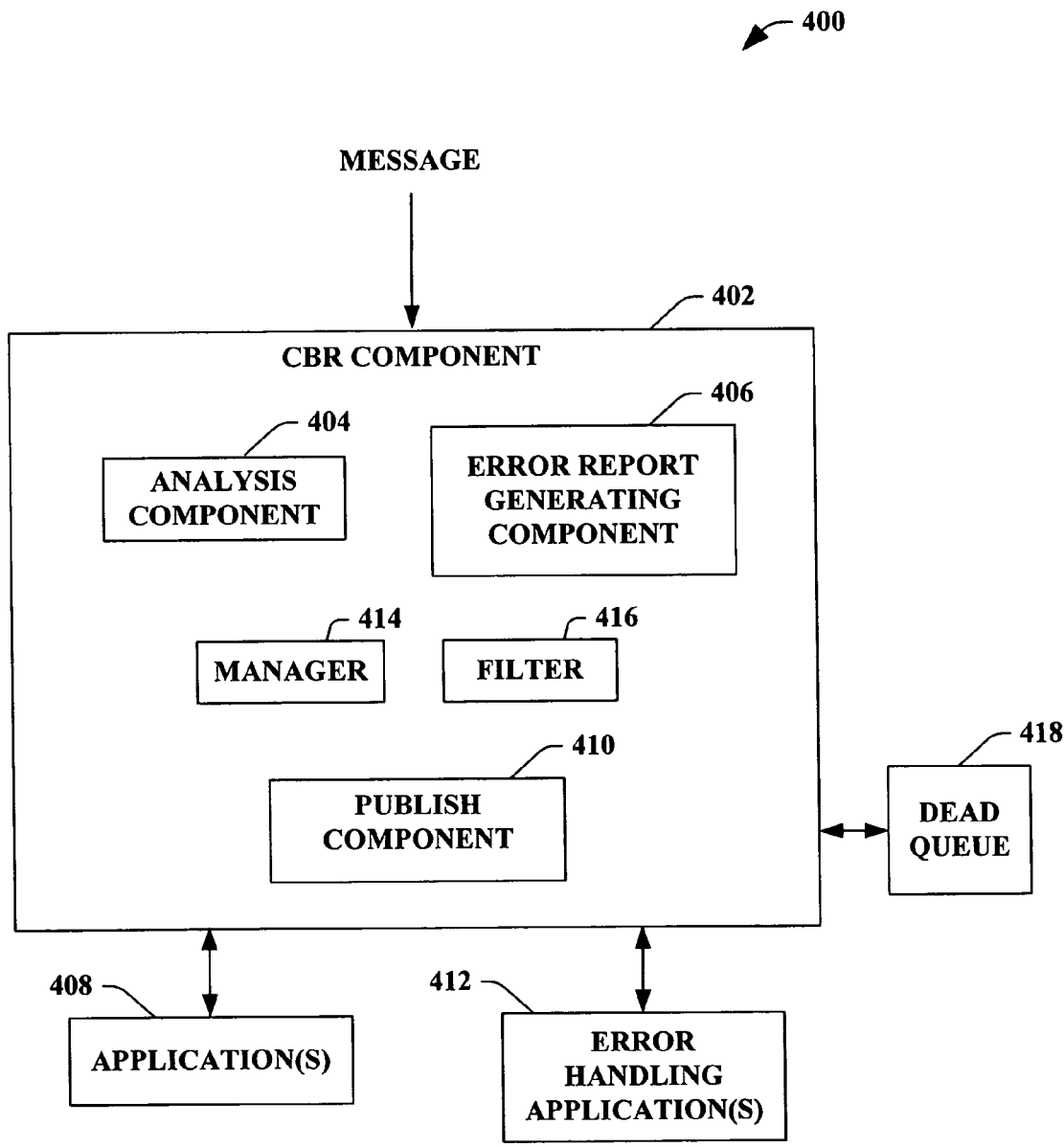
FIG. 4 illustrates a block diagram of an exemplary system that facilitates automatically repairing and re-publishing a failed message related to content-based routing.

FIG. 4 illustrates a system 400 that facilitates automatically repairing and re-publishing a failed message related to content-based routing. A CBR component 402 can receive a message, wherein an analysis component 404 can determine if the message has an error. The message with the related error (also referred to as a failed message) can be cleared of any routing metadata by an error report generating component 406. Moreover, the error report generating component 406 can create an error report message, wherein the error report message is the cleared message that has an error specific metadata associated therewith. The created error report message can be posted by a publish component 410, wherein any error handling application(s) 412 can subscribe to receive the message. The error handling application(s) 412 can automatically correct the failed message and/or act upon the failed message accordingly. It is to be appreciated that the error handling application(s) 412 for the purpose of the subject application can be applications specific to handling errors, yet both application(s) 408 and error handling application(s) 412 can be considered subscribers to the CBR component 402.

For instance, the error report messages can be acted upon in various manners by the error handling application(s) 412. The following can be performed after the error handling application has received the error report message based at least in part upon the error specific metadata associated therewith: 1) if the error handling application and/or error handler recognizes the error and knows how to fix it, the message is automatically corrected and re-submitted to the CBR component 402 for content-based routing; 2) if the error handler and/or error handling application recognizes the error but cannot fix it, a business process with a human workflow can send the message to a business user and/or application and awaits the correction to be invoked; 3) the error handler and/or error handling application can save the failed messages in a dedicated storage (e.g., a dead queue 418) for a business user and/or application to review; and 4) if the error handling application and/or error handler does not recognize the failed message or does not know how to handle the error associated to the message or the application itself fails, the message can be suspended within a dead queue 418.

The CBR component 402 can include a manager 414 that can manage the error handling application(s) 412 and/or application(s) 408. The management of error handling application(s) 412 and/or application(s) 408 can include adding subscribers, removing subscribers, subscriber communication settings, subscriber access settings, adding applications, removing applications, application communication settings, application access settings, etc. Moreover, the manager 414 can provide various security techniques (e.g., login, password, human interaction proofs (HIPS), etc.) to validate and secure any error handling application(s) 412 and/or application 408 attempting to subscribe to the publish component 410. Although illustrated as being incorporated into the CBR component 402, it is to be appreciated that the manager 414 can be incorporated into any component within the system 400, a stand-alone component, and/or any combination thereof.

The CBR component 402 can further utilize a filter 416 that can be created and utilized by the system 400 to specify the error specific details that can be utilized by a router to determine if the error report message should be given to an application, an error handling application, an error handler, etc. In other words, the subscriber (e.g., an application, an error handling application, etc.) to error report messages can register a filter 416 to filter out subscriptions and based on such subscriptions the error report messages can be routed out accordingly. It is to be appreciated that the filter 416 can be substantially similar to a filter utilized by any content-based routing system and the subject invention is not so limited to the filters utilized by the CBR component 402.

The dead queue 418 can that can store various data related to the system 400. The dead queue 418 can provide storage for failed messages that are suspended, failed messages that are to be corrected, error report messages, filters, subscriber information, etc. The dead queue 418 is a concept employed within content-based routing and represents a location where failed messages can be stored. It can also be referred to as a dead letter queue, suspended queue, error queue, etc. The dead queue 418 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The dead queue 418 of the subject systems and methods is intended to comprise, without being limited to, these and any other suitable types of memory. In addition, it is to be appreciated that the dead queue 418 can be a server, a database, a hard drive, and the like.

Figure 5:
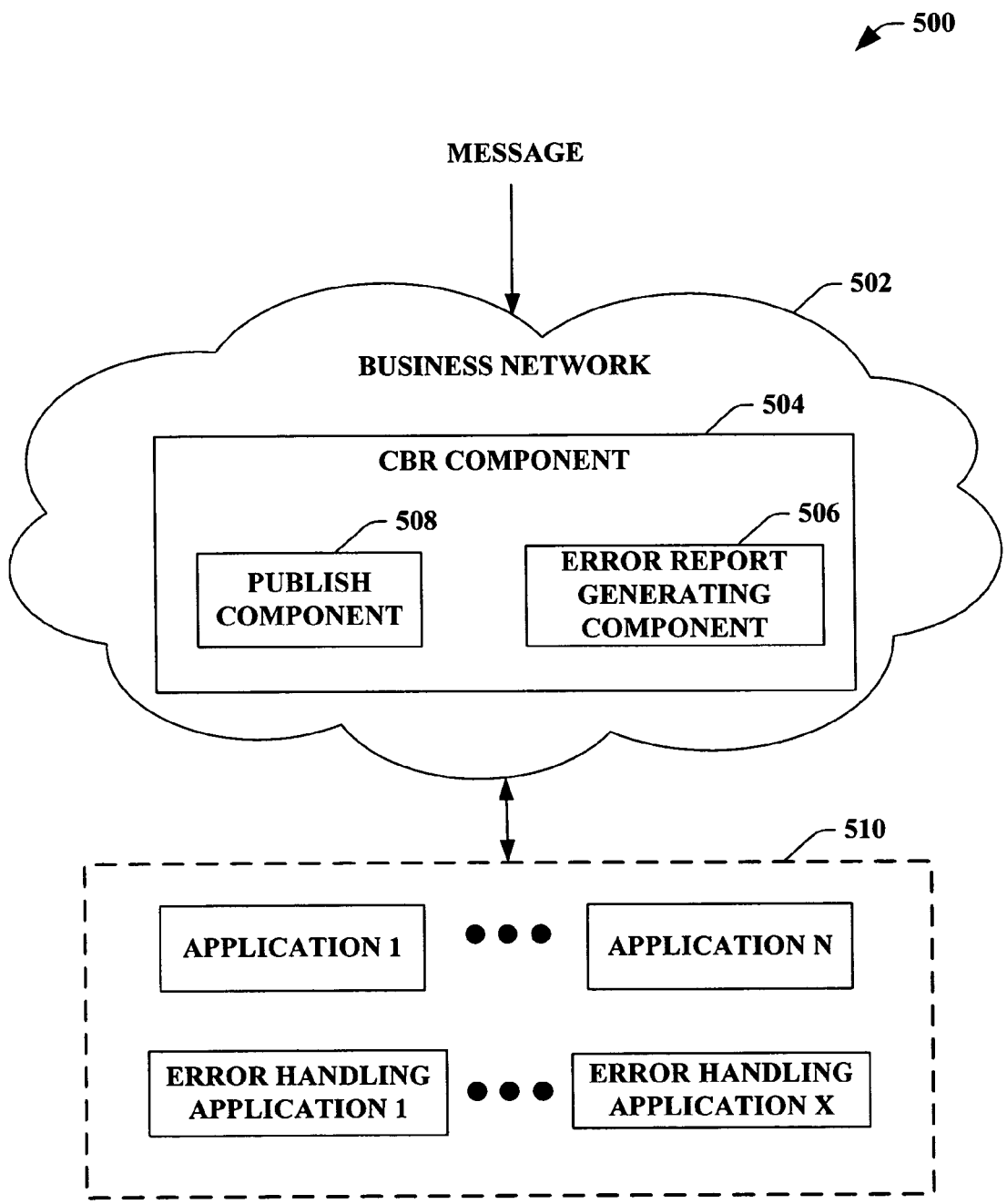
FIG. 5 illustrates a block diagram of an exemplary system that facilitates error detection and correction associated with a business network that utilizes content-based routing.

FIG. 5 illustrates a system 500 that facilitates error detection and correction associated with a business network that utilizes content-based routing. A CBR component 504 can be incorporated and/or utilized by a business network 502, wherein an error report generating component 506 can receive a failed message intended to be routed by the business network 502 to at least one of a plurality of subscribers 510. The subscribers 510 can include at least one application (having application 1 to application N, where N is an integer greater than 1). It is to be understood that an error-free message within the business network 502 can be posted by a publish component 508 to allow various subscribers (e.g., applications and/or error handling applications) 510 to handle such messages. Yet, when a message is undeliverable and/or has failed, the error report generating component 506 can delete metadata associated with the failed message and associate error specific metadata to the failed message creating an error report message. The CBR component 504 can utilize the publish component 508 to post the error report message, wherein at least one error handling application which subscribes to receive error report messages based upon a particular subscription and/or error metadata. The subscribers 510 can include any number of error handling applications that subscribe to receive such error report messages, wherein there can be an error handling application 1 to an error handling application X, wherein X is an integer greater than or equal to 1. It is to be appreciated that the error report generating component 506 and the publish component 508 can be substantially similar to the error report generating component 406, 306, 206, and 106 and the publish component 410, 310, and 210 in FIG. 4, 3, 2, and 1 respectively.

The business network 502 can be an integration server product that enables the development, deployment, and/or management of an integrated business process and/or extensible markup language (XML) based Web service. The business network 502 can unite separate applications into a coherent whole, wherein a deep integration between messaging, orchestration, security, and support for industry standards can be provided. Furthermore, the business network 502 can provide, but is not limited to providing, a business activity service, a human workflow service, and/or a business activity monitoring framework that enables interaction with business processes. The business network 502 can further connect applications within a single organization (e.g., commonly referred to as enterprise application integration (EAI)), and/or connect applications in different organizations (e.g., referred to as business to business (B2B) integration).

In one example, the business network 502 can enable the creation of a business process that spans multiple applications by providing: 1) a manner to specify the business process; and 2) a technique for communicating between applications that such business processes utilize. In this example, the business network 502 can implement a business process which includes one or more orchestrations, wherein the orchestration consists of executable code. For instance, an orchestration can be created by graphically organizing a defined group of shapes to express the conditions, loops, and other behavior of the business process. In another example, the business network 502 can utilize a business rules engine to provide the expression of rules in a business process. It is to be appreciated that each orchestration creates a subscription to indicate the kinds of messages received therewith. A message can be received by an adapter, wherein a pipeline can transform the message into a particular format (e.g., XML). Such formatted message can be stored into a database, wherein such messages can be dispatched to a target orchestration to partake in an action respective to the business process. The result of such process can be another message, typically saved in the database. The resultant message can then be processed by a send pipeline that can convert and/or format the message from the internal format (e.g., XML) to a format particular to a destination and sent to such destination via an adapter. The above is one example of the business network 502 and is not to be seen as a limitation on the subject invention.

The following is an example of utilizing the automatic error detection and correction associated with the business network 502 that utilizes content-based routing and is not to be seen as a limitation of the subject invention. The business network 502 can utilize receive and send ports having a configuration options referred to as "Generate Error Report for failed message." This option can control what occurs to the message if processing error(s) arise. The property can be set to the following: 1) False (a default)—On any failure in processing of the message in this port the message is suspended; and 2) True—For a message that fails processing in the port the error report message can be generated and given to a content-based router (e.g., a message box within the business network 502) for routing to subscribing applications and/or error handlers; if there is no subscriber to the failed message then the message can be suspended and an error event can be logged in an event log (not shown). It is to be appreciated that the configuration on receive port can apply to all receive locations in that port and configuration on the send port applies to both primary and backup transports.

In another example, the following sequence of actions can apply if the port is marked as "Generate Error Report for failed message" as illustrated above. If the message processing and/or routing error occurs, the business network 502 can implement the following rather than suspending the failed message: 1) Create a cloned message and de-promote all the promoted properties, wherein the properties serve the role of message metadata which the CBR component 504 can determine the recipient of the message (e.g., this avoids non-error handling subscription firing); 2) Put error description on the message context (e.g., "The assembler component cannot load the schema named blah.xsd"); 3) Promote the failure specific properties (e.g., ReceivePortName="MyReceivePort", MessageType="msgtype#mynamespace", FailureCode="0x1824", etc.; and 4) Attempt to re-publish this message to the CBR component 504.

The following table illustrates a list of promoted properties that can be utilized in conjunction with the subject invention.

| Property name | Promoted | Description |
| --- | --- | --- |
| FailureCode | Yes | Error code |
| FailureCategory | Yes | Category of failure (e.g., pipeline, routing, transmission, . . . ) |
| Description | No | Error description |
| MessageType | Yes | Message type of failed message (may be empty) |
| ReceivePortName | Yes | Name of the receive port where failure happened |
| InboundTransportLocation | Yes | URI of the receive |

-continued

| Property name | Promoted | Description |
| --- | --- | --- |
| | | location where the failure happened |
| SendPortName | Yes | Name of send port where failure happened |
| OutboundTransportLocation | Yes | URI of the send location where the failure happened |
| FailedMessage | Yes | Indicates that this is a failure report message. This property does not have any value set, the fact that it is promoted is enough to indicate that. |

Figure 6:
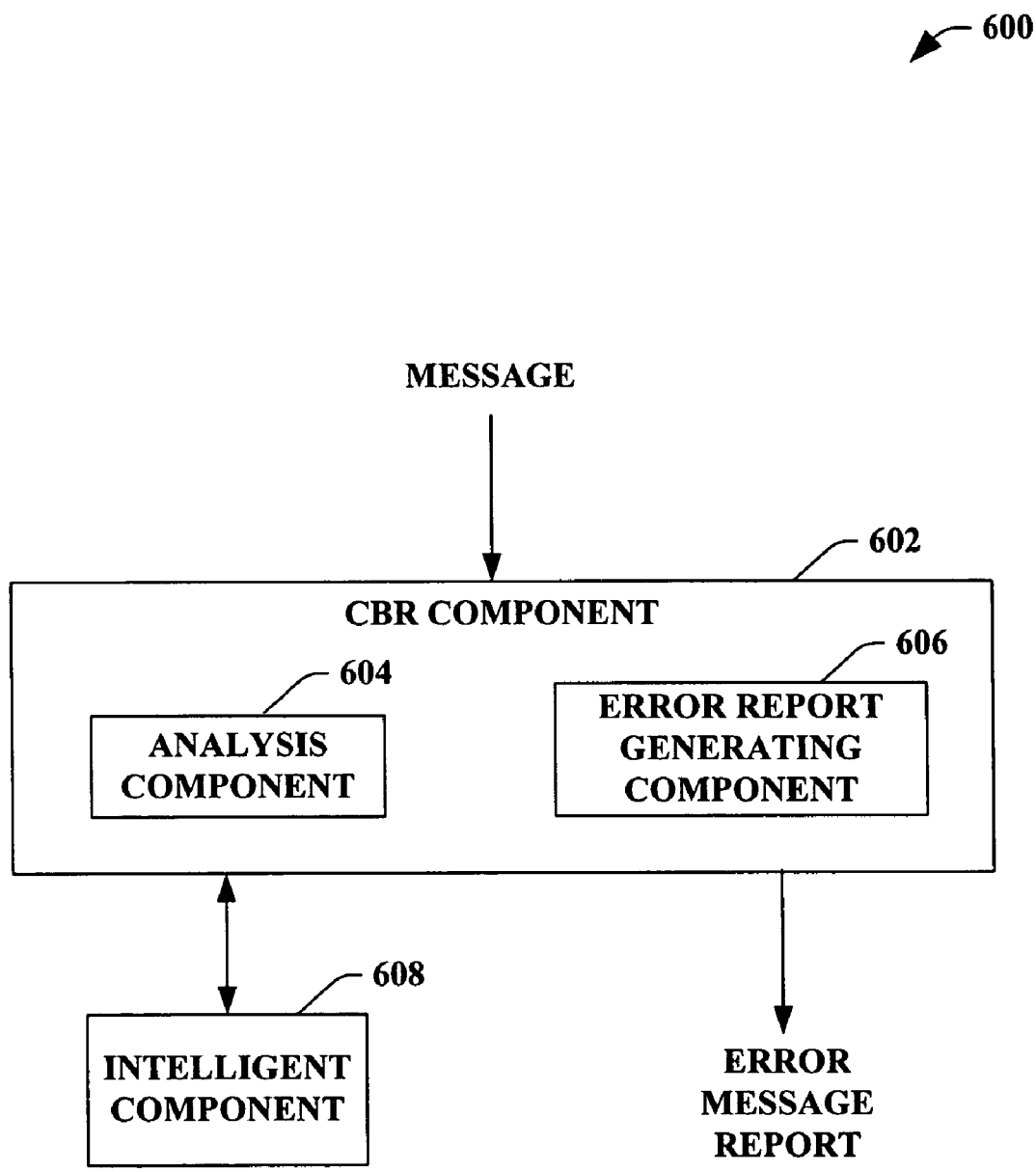
FIG. 6 illustrates a block diagram of an exemplary system that facilitates error detection and correction associated with content-based routing.

FIG. 6 illustrates a system 600 that employs intelligence to facilitate error detection and correction associated with content-based routing. The system 600 can include a CBR component 602, an analysis component 604 (e.g., to determine whether a message has failed), and an error report generating component 606 that can all be substantially similar to respective components described in previous figures. The system 600 further includes an intelligent component 608. The intelligent component 608 can be utilized by the error report generating component 602 and/or the CBR component 602 to facilitate generating an error report message that can be utilized by any routing system to allow failed messages to be corrected automatically. For example, the intelligent component 608 can infer the deletion of metadata associated with the failed message, addition of error specific metadata to the failed message, routing of an error report message, analyzing the failed message, etc.

It is to be understood that the intelligent component 608 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the subject invention.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
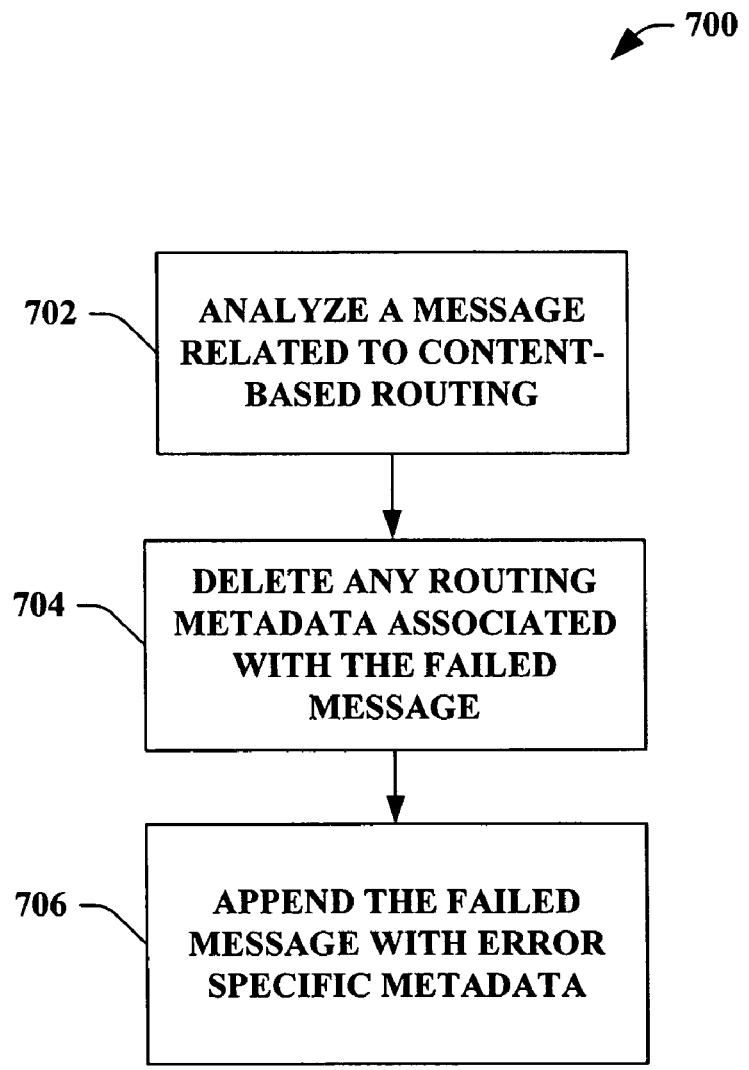
FIG. 7 illustrates an exemplary methodology for automatically handling an error message related to content-based routing systems.
Figure 8:
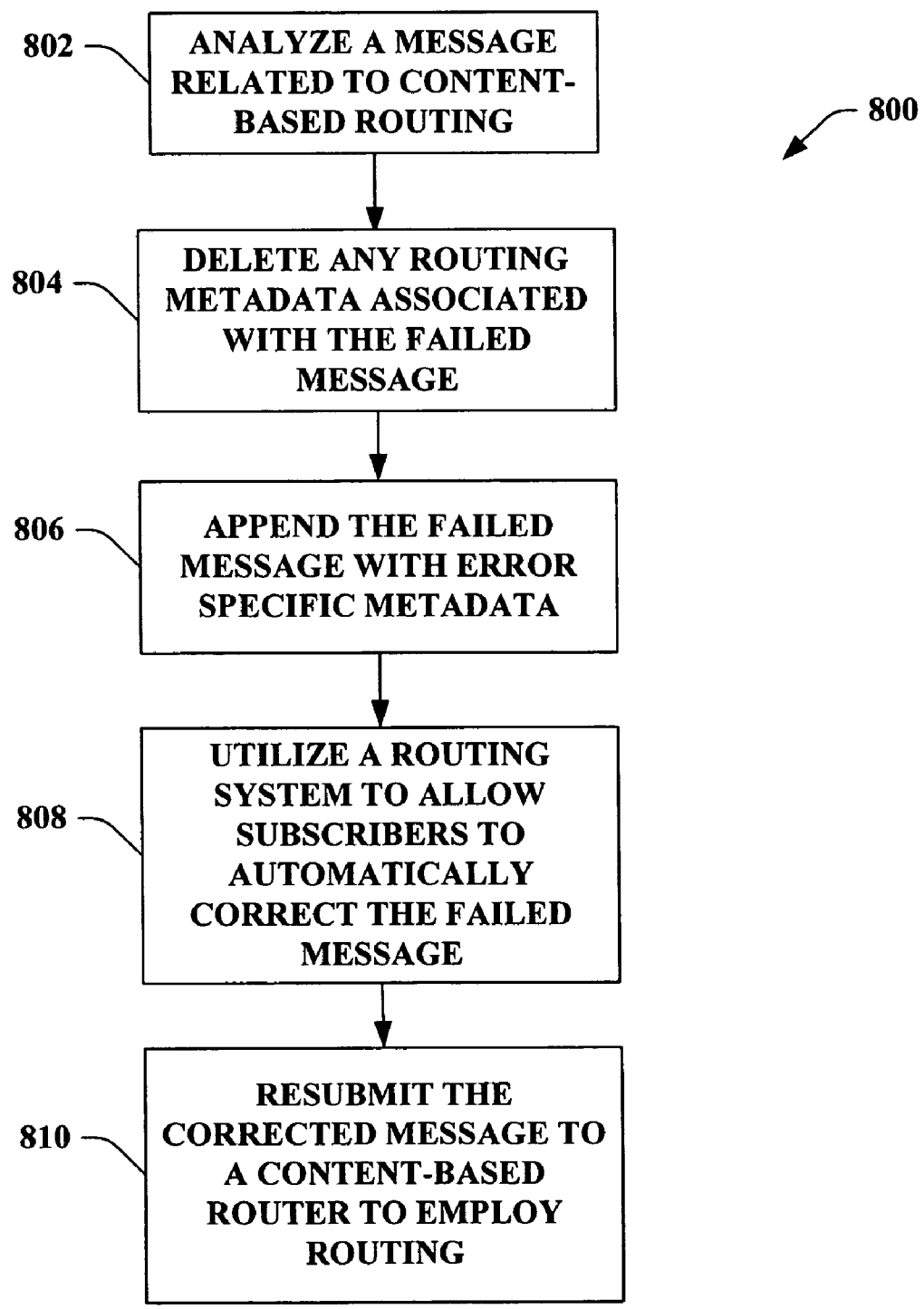
FIG. 8 illustrates an exemplary methodology that facilitates automatically repairing and re-publishing a failed message related to content-based routing.

FIGS. 7-8 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 7 illustrates a methodology 700 for automatically handling an error message related to content-based routing systems. At reference numeral 702, a message related to content-based routing can be received and analyzed to determine if the message has an error related therewith. The message can be determined to be a failed message, if the content-based routing system cannot deliver and/or route the message accordingly. For example, the message can have a syntax error, a validation error, a syntax validation error, a complex business logic error, a receiving system and/or application can be unavailable, etc. At reference numeral 704, any routing metadata associated with the failed message can be deleted. By deleting any routing metadata, the routing of the failed message to the expecting application and/or system is prevented. At reference numeral 706, the failed message can be appended with error specific metadata to create an error report message. The error specific metadata can be, but is not limited to, location of failure, reason for failure, error code and category, syntax error, location of syntax error, etc. By attaching the error specific metadata to the failed message and creating the error report message, any error handling application that subscribes to such error and/or error handler can automatically handle the failed message to allow the correct routing associated therewith. It is to be appreciated that any suitable content-based routing system and/or component can be employed in order to route the error report messages to applications, subscribers, and/or error handling applications.

FIG. 8 illustrates a methodology 800 that facilitates automatically repairing and re-publishing a failed message related to content-based routing. At reference numeral 802, a message related to a content-based routing system can be analyzed to determine whether or not the message has an error and/or if the message is undeliverable. For instance, a message can contain various errors associated to the routing such as, but not limited to, validation errors, syntax errors, content errors, etc. At reference numeral 804, any metadata related to the failed message can be deleted. In particular, any routing metadata associated with the failed message can be deleted so as to prevent an expecting application and/or system having the failed message routed thereto. At reference numeral 806, the failed message cleared of any routing metadata can be appended with error specific metadata to create an error report message. For instance, the error specific metadata can include error details describing the reason(s) and/or cause(s) for the failure of the message. The error details can include, but are not limited to, the location of where the message failed, the reason for failure, the error code and category, syntax error locations, etc.

At reference numeral 808, the error report message can be posted and/or published via a content-based routing system and/or component to allow a subscriber and/or error handling application to automatically handle the failed message based at least in part upon the error specific metadata. In one example, the error report message can be submitted to a content-based routing system to allow at least one subscriber such as an error handling application and/or error handler to enact upon the failed message. The following can be performed after the subscriber has received the error report message based at least in part upon the error specific metadata associated therewith: 1) if the subscriber and/or error handler recognizes the error and knows how to fix it, the message is automatically corrected and re-submitted for content-based routing; 2) if the error handler and/or subscriber recognizes the error but cannot fix it, a business process with a human workflow can send the message to a business user and/or application and awaits the correction to be invoked; 3) the error handler and/or subscriber can save the failed messages in a dedicated storage (e.g., a dead letter queue) for a business user and/or application to review; and 4) if the subscriber and/or error handler does not recognize the failed message or does not know how to handle the error associated to the message or the application itself fails, the message can be suspended within a dead letter queue.

At reference numeral 810, the corrected message can be resubmitted to a content-based routing system and/or application to continue the previously failed routing. In other words, the original failed message has been automatically corrected and can now be correctly routed based at least on the error-free content associated therewith. It is to be appreciated that any suitable routing system and/or mechanism can be employed in order to provide accurate and correct routing of the once failed message. In general, the method 800 provides the automatic correction of failed messages within any suitable routing system and/or application, wherein the once-failed messages can be correctly routed based at least in part upon content associated therewith.

Figure 9:
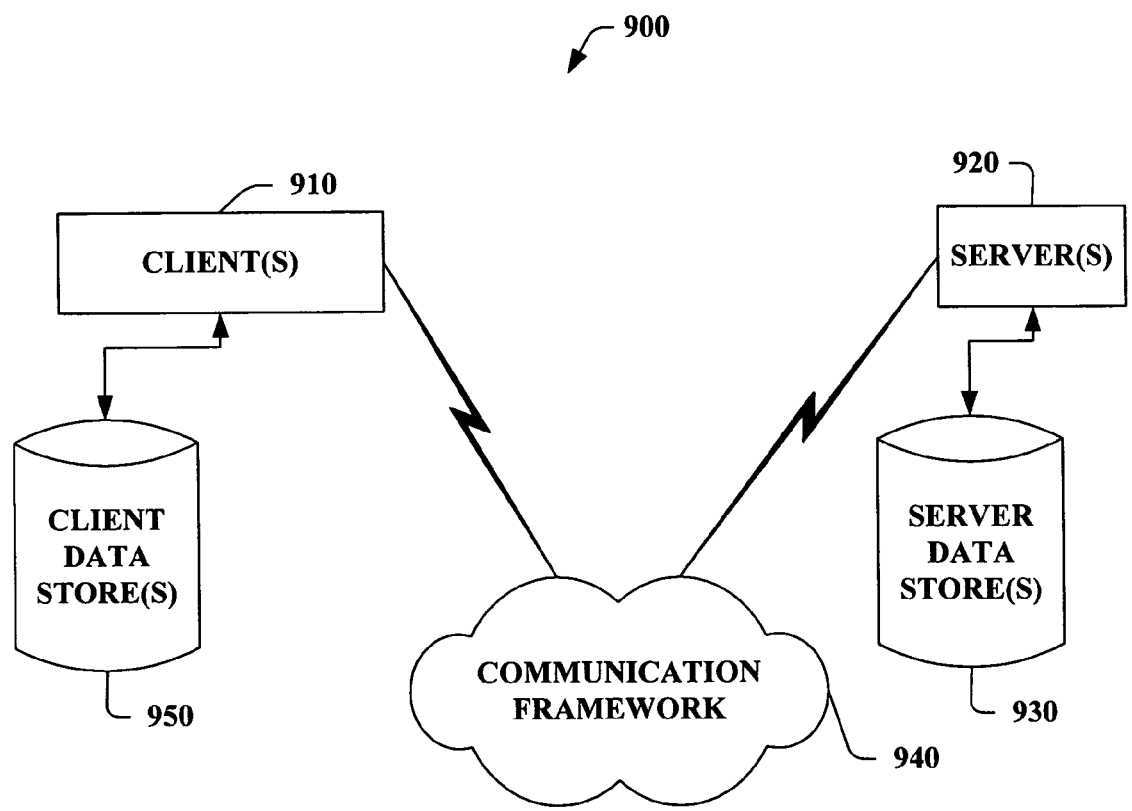
FIG. 9 illustrates an exemplary networking environment, wherein the novel aspects of the subject invention can be employed.
Figure 10:
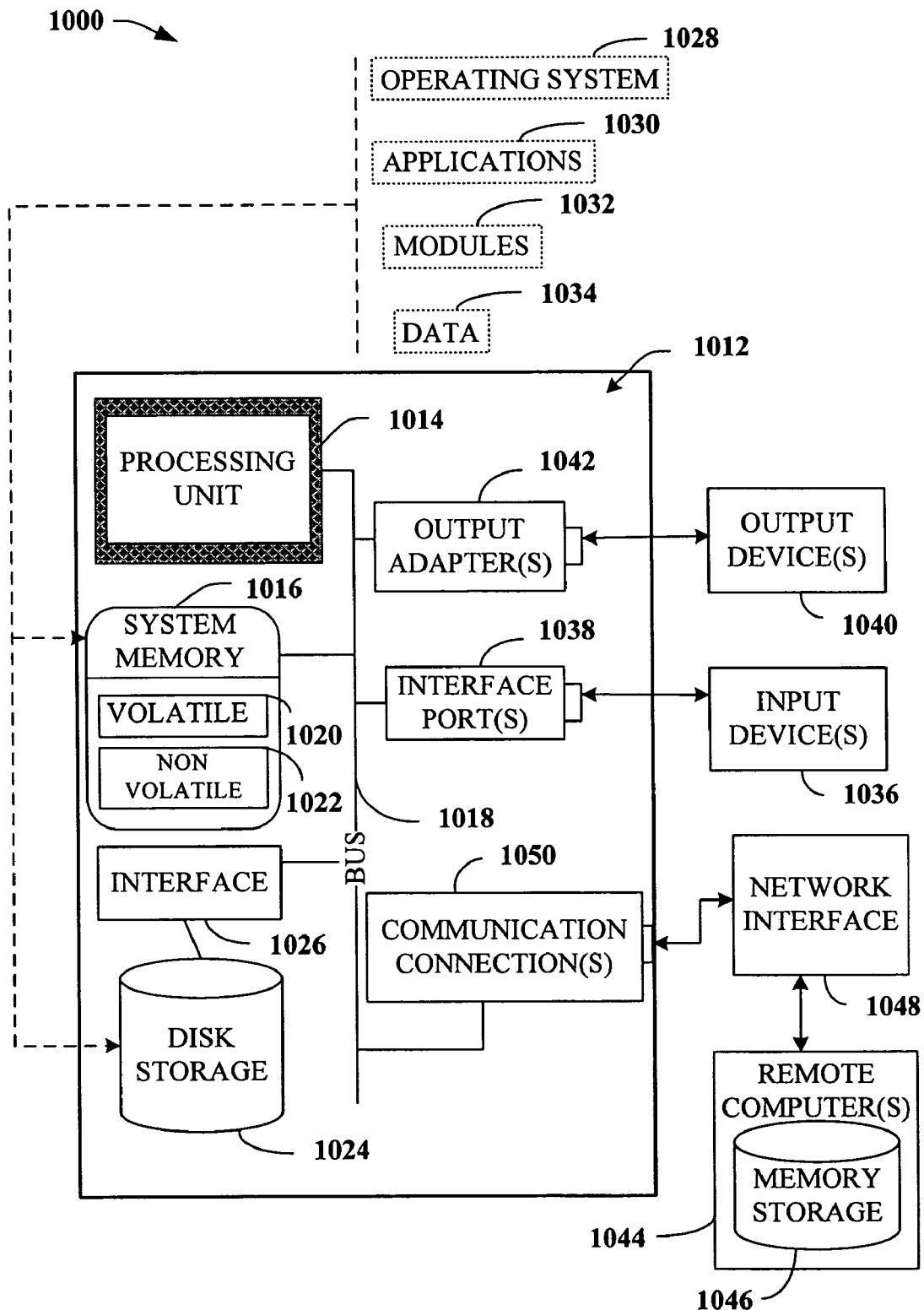
FIG. 10 illustrates an exemplary operating environment that can be employed in accordance with the subject invention.

In order to provide additional context for implementing various aspects of the subject invention, FIGS. 9-10 and the following discussion is intended to provide a brief, general description of a suitable computing environment in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 9 is a schematic block diagram of a sample-computing environment 900 with which the subject invention can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject invention, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A routing system that facilitates error detection and correction, comprising:
    an analysis component that determines whether a received message is associated with an error;
    an error report generating component that appends error-related metadata to the message creating an error report message; and
    a publish component that publishes the error report message such that the error report message is accessible to at least one subscribing error handling application.

2. The system of claim 1, further comprising a cleanse component that deletes existing routing metadata associated with the message.

3. The system of claim 1, the publish component can post an error-free message and the error report message to allow at least one of an application, subscriber, error handler and an error handling application to handle the error-free message and the error report message.

4. The system of claim 1, the subscribing error handling application provides at least one of the following: 1) automatic correction of the error associated with the message; 2) recognition of the error allowing a business process to send the message to at least one of a business user and application to invoke correction; 3) automatic storage of the message in a dedicated storage allowing at least one of a business user and application employ correction; and 4) suspension of the message within a dead queue based upon at least one of an unrecognized error, incomprehension on how to handle the error, and an application failure where the application was to receive the message.

5. The system of claim 4, the corrected message is re-published to a content-based router to correctly route the message to at least one application based at least in part upon the content of the message.

6. The system of claim 1, further comprising a manager that provides at least one of a management of at least one subscribing error handling application and an implementation of a security technique related to at least one subscribing error handling application.

7. The system of claim 1, further comprising a filter that specifies error specific details utilized by a content-based router to determine if the error report message is given to the subscribing error handling application.

8. The system of claim 1, further utilizing a dead queue that can store at least one of an uncorrectable message and a failed message to be evaluated by one of a business user and an application.

9. The system of claim 1, the error-related metadata contains at least one of the following: 1) a location where the message failed; 2) a reason for failure; 3) an error code and a category; a syntax error location; a syntax error description; a recipient detail; and validation information.

10. The system of claim 1, the received message is associated with an error that indicates that the message is undeliverable.

11. The system of claim 1, the routing system is a business network that enables at least one of a development, a deployment, and a management of one of an integrated business process and a language based Web service, wherein separate applications can be united into a coherent whole to allow for at least one of the connection of an application within a single organization and the connection of an application in disparate organizations.

12. The system of claim 11, the business network includes at least one of a send port and a receive port with a configuration option related to generating the error report message.

13. The system of claim 12, the configuration option has a default setting that is a false property that suspends the received message associated with the error.

14. The system of claim 12, the configuration option is a true for the message associated with the error to generate the error report message.

15. A computer-implemented method that facilitates error detection and correction, comprising:
    analyzing a message related to content-based routing to determine if the message has failed;
    deleting routing metadata associated with the failed message;
    appending the failed message with error specific metadata to create an error report message; and
    publishing the error report message such that the error report message is accessible to at least one subscribing error handling application.

16. The method of claim 15, further comprising:
    utilizing a routing system to allow at least one error handling application to handle the failed message; and
    resubmitting the failed message after the error handling application has automatically corrected the error to a content-based router to employ routing.

17. A computer readable storage medium having stored thereon computer executable instructions that carry out the method of claim 15.

18. A computer-implemented system that facilitates error detection and correction, comprising:
- means for determining that a received message is associated with an error;
- means for appending error-related metadata to the message creating an error report message; and
- means for publishing the error report message such that the error report message is accessible to at least one subscribing error handling application.

* * * * *